J. Ponton.
Machinery for Raising Sunken Vessels
Nº 17,892.         Patented Jul. 28, 1857.
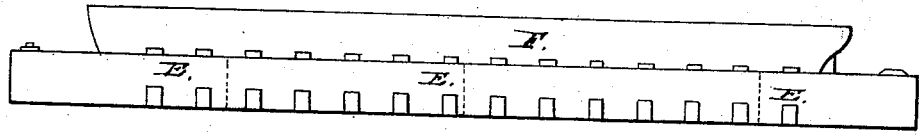
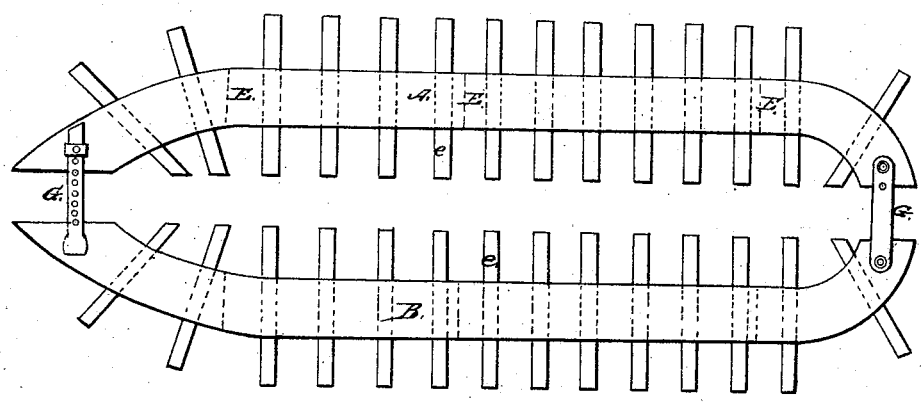
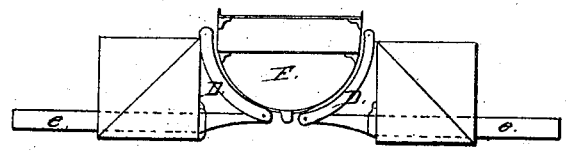
Witnesses.
Chas. H. Haswell
E. H. Haswell
Inventor.
John Ponton.

UNITED STATES PATENT OFFICE.

JOHN PONTON, OF NEW YORK, N. Y.

MODE OF RAISING SUNKEN VESSELS.

Specification of Letters Patent No. 17,892, dated July 28, 1857.

*To all whom it may concern:*

Be it known that I, JOHN PONTON, of the city, county, and State of New York, have invented a new and Improved Mode of Sustaining and Raising Sunken, Grounded, or Stranded Vessels or Bodies; and I do hereby declare that the following is a full and exact description thereof, reference being had to the accompanying drawings and to the letters of reference marked thereon.

The nature of my invention consists in the arrangement of the adjustable supports and slides, &c.

To enable others skilled in the art to make and use my invention, I will proceed to describe its construction and operation.

I construct two tanks or reservoirs A B adapted to the general outline of the sides of a vessel or to the outside of the body to which it is to be applied which tanks or reservoirs being first filled with water; to an extent that will depress them to the depth required, are brought around and under the vessel or body F to be operated upon or they may be first attached to the vessel or body and then depressed to the depth required, and then the water within them pumped or forced out, as may be best practicable, and its place occupied with air, by which means buoyancy may be given to the tanks to an extent that will float or retain in suspension the vessel or body to which they are attached.

D, D, are adjustable and changeable supports whereby the peculiar conformation of the body to which the tanks are to be applied may be fitted so as to admit of the tanks being brought as close to the body as practicable.

e, e, are slides by which the supports D D are made adjustable, and which also aid in sustaining the body to be supported or raised.

E, E, E, are divisions in the tank whereby their buoyancy may be adjusted to the case required, or to the necessary equilibrium of stability of the mass. G G, are adjustable connections of the tanks whereby they are secured together and fitted to the body to which they are to be applied.

What I claim as my invention and desire to secure by Letters Patent, is—

The arrangement of the adjustable and changeable supports D, D, operating alone or in connection with the slides e, e, whereby the tanks may be brought more closely in connection with, and the sustaining power of them more generally and uniformly distributed along a vessel or body.

New York, January 7, 1857.

JOHN PONTON.

Witnesses:
CHAS. H. HASWELL,
E. H. HASWELL.